Feb. 1, 1955 G. A. ESTEL, JR 2,701,155
OIL SEAL UNIT AND EXPANDER RING THEREFOR
Filed Feb. 19, 1951
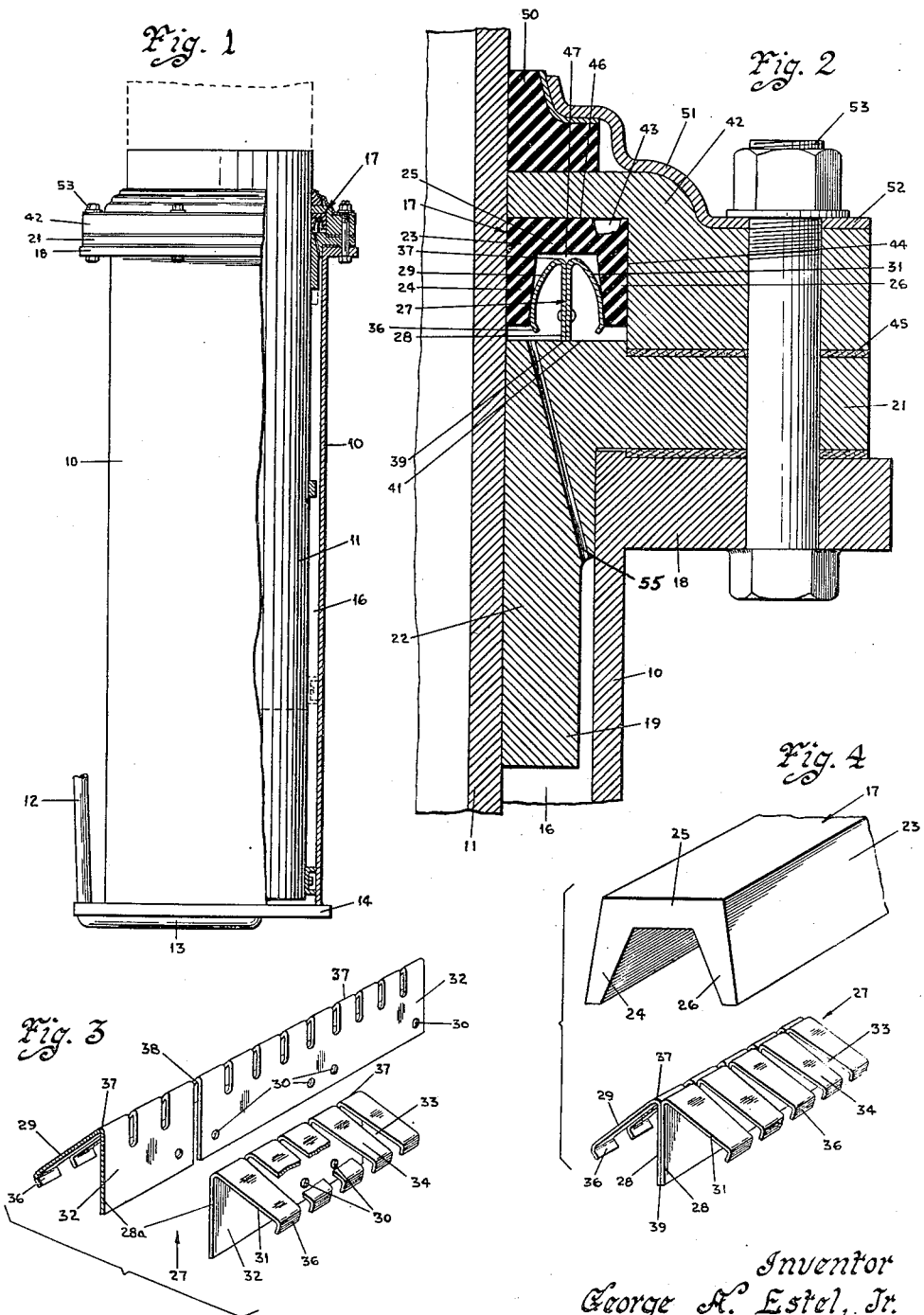
Inventor
George A. Estel, Jr.
By Rudolph L. Lowell
Attorney

United States Patent Office 2,701,155
Patented Feb. 1, 1955

2,701,155

OIL SEAL UNIT AND EXPANDER RING THEREFOR

George A. Estel, Jr., Des Moines, Iowa, assignor to Globe Hoist Company, Des Moines, Iowa, a corporation of Iowa Application February 19, 1951, Serial No. 211,719

3 Claims. (Cl. 288—5)

This invention relates generally to fluid sealing devices for use between movable and stationary members and in particular to a fluid sealing device of this type, and an expander ring formed as a part thereof, for use between the cylinder and a lift piston of a vehicle hoist of hydraulic type.

An object of this invention is to provide an improved fluid sealing device for the lift piston of a vehicle hoist.

A further object of this invention is to provide a fluid sealing device between a movable member and a stationary member which is effective to maintain the seal over a prolonged period of time against the action thereon of the movable member.

Still another object of this invention is to provide an expander ring for a U-packing ring in a fluid sealing device which is self-centering within the packing ring and of a flexible construction so as to continuously bias the side walls of the packing ring away from each other.

Yet a further object of this invention is to provide an expander ring for a U-packing ring in a fluid sealing device which can be manufactured in straight lengths and then cut into shorter lengths for forming expander rings of any desired diameter.

Another object of this invention is to provide a fluid sealing device for the lift piston of a hydraulic hoist which is of a simple and compact construction, economical to manufacture, easy to install and capable of effecting an efficient sealing action over a prolonged service life with a minimum of maintenance.

Further objects, features, and advantages of this invention will become apparent from the following description when taken in connection with the accompanying drawing in which:

Fig. 1 is a side elevational view of the cylinder and lift piston for a vehicle hoist of hydraulic type with parts thereof broken away to more clearly show the assembly therewith of the fluid sealing device of this invention;

Fig. 2 is an enlarged view of the sectional showing in Fig. 1 of the assembly of the fluid sealing device with the lift piston and cylinder;

Fig. 3 is an exploded fragmentary perspective view of the expander ring shown in Fig. 2; and Fig. 4 is an exploded fragmentary perspective view of the expander ring and U-packing ring assembly shown in Fig. 2.

With reference to the drawing there is shown in Fig. 1 a cylinder and piston assembly for a vehicle lift of hydraulic type, in which the piston 11 is supported in a spaced relation within the cylinder 10 for up and down reciprocal movement. The piston 11 is of a hollow cylindrical construction and has a suitable valve controlled opening in its lower end open to the cylinder 10, so that both the piston and the cylinder constitute a reservoir for a liquid such as oil.

In the operation of the hoist air under pressure is admitted from a suitable source through a pipe 12 connected with a passage 13 in the base 14 of the cylinder 10, and with the passage 13 in turn being connected with an air conduit extended upwardly through the cylinder base and into the piston 11 to a point above the level of the oil within the piston. On the introduction of air into the piston 11 the air pressure is applied to the body of oil within the piston and cylinder whereby a lifting oil pressure is exerted against the bottom of the piston 11 to raise the same.

As shown in Fig. 1 the oil within the cylinder 10 also fills the space 16 between the cylinder and the piston 11 to lubricate the piston. It is necessary, therefore, to provide a fluid sealing device or piston oil seal unit, indicated generally at 17, to prevent the oil under pressure within the space 16 from leaking upwardly and outwardly from the upper end of the cylinder 10.

Referring to Figs. 1 and 2 it is seen that the upper end of the cylinder 10 terminates in a laterally extended flange 18. An upper bearing 19 for the piston 11 is of an inverted L-shape having one leg section 21 resting on the flange 18, and its other leg section 22 extended downwardly from the flange 18 between the cylinder 10 and the piston 11, so as to be in bearing engagement with the piston 11.

The piston oil seal unit 17 is comprised of a packing ring 23 of a rubber or like composition, and of a U-shape in transverse cross section. Received between the legs 24 and 26 of the packing ring 23 is an expander ring 27 formed of a flexible spring material. The expander ring 27 is of a substantially V-shape in transverse cross section and is integrally formed with a center or intermediate leg 28 which is longer than, and extended between, the leg sections 29 and 31 of the expander ring.

With reference to Figs. 3 and 4 it is seen that the expander ring 27 is composed of a plurality of spring sections 32 of a substantially V-shape in transverse section. Each section 32 is formed from a piece of flat spring material which is initially stamped to cut out the longitudinally spaced transversely extended slots 33 to form a series of spring fingers 34 in each leg section 29 and 31 of the completed expander ring. In this stamping operation the rivet holes 30 are also formed. Following this stamping operation each section 32 is put through a pair of forming operations the first of which results in bending the terminal ends 36 of the spring fingers 34, and the second of which results in forming the apex 37 which defines the junction of a leg section 29 and 31 with a corresponding intermediate leg portion 28a.

The slots 33 extend over the full length of a leg section 29 and 31 and into the apex portion 37 so that each leg section 29 and 31 is comprised of a plurality of spring fingers 34, while an intermediate leg portion 28a is substantially of a flat solid metal construction.

In the assembly of the formed sections 32, to form the expander ring 27, the sections 32 are arranged opposite each other in a staggered relation with the intermediate leg portions 28a against each other so that the junction indicated at 38, between a pair of adjacent sections 32, is intermediate the ends of a transversely opposite section 32. With the sections 32 thus positioned, the intermediate leg portions 28a are riveted together at the rivet holes 30.

On completion of this riveting operation the connected sections 32 are in linear alignment, namely, in a straight length which can be cut to any desired lengths to form expander rings 27 of desired diameters. In other words, after the jointed sections 32 have been cut to be a desired length, the opposite ends of such length are riveted together to form the expander ring 27.

With the expander ring 27 thus formed (Fig. 4) the ring is inserted between the legs 24 and 26 of the packing ring 23 such that the apex portions 37 are opposite the base section 25 of the packing ring 23. By virtue of the expander ring 27 being constructed of a flexible spring material, and with each of the leg sections 29 and 31 being comprised of a series of spring fingers 34, the ring 27 is flexible, in a direction radially thereof, so as to fit within the packing ring 23, even though the packing ring may be a little out of round, namely, not a true circle. Further, the flexible construction of the expander ring 27 provides for the expander ring being self-centering within the packing ring 23.

As best appears from a consideration of Fig. 4, the transverse dimension of the expander ring 27 is initially greater than the distance between the legs 24 and 26 of the packing ring 23, so that on insertion of the expander ring 27 within the packing ring the spring legs 29 and 31 are flexed or moved inwardly toward each other. As a result, each spring leg 29 and 31 effects an independent spring action on corresponding legs 24 and 26 of the packing ring 23.

The assembly of the expander ring 27 and packing ring 23 is positioned about the piston 11 with the free end 39 of the intermediate leg section 28, which is comprised of the portions 28a, resting on the top side 41 of the upper bearing portion 21, and with the leg section 24 of the packing ring 23 in wiping or contact engagement with the piston 11. This assembly is maintained about the piston 11, and on the upper bearing portion 21, by a holding ring 42 positioned about the piston 11, and formed in its inner peripheral surface with an annular recess 43 which is open to the bottom side 45 of the holding ring 42, and of a size and shape to snugly receive the packing ring 23 therein. In other words, with the holding ring 42 positioned about the piston 11, the leg section 24 of the packing ring 17 is pressed against the piston 11, and the leg section 26 is pressed against the inner side wall 44 of the recess 43, whereby to hold the packing ring against movement transversely of the piston 11.

Referring to Fig. 2, it is seen that the side wall 44 of the recess 43 is of a greater length than the length of the leg sections 24 and 26 of the packing ring 23, so that when the bottom side 45 of the holding ring 42 rests on the upper bearing portion 21, and the end wall 46 of the recess 43 is in contact engagement with the base section 25 of the packing ring 23 a space indicated at 47 is provided between the apex portions 37 of the expander ring 27 and the base section 25.

With this spaced relation between the apex portions 37 of the expander ring 27, and the base section 25 of the packing ring 23, the curved terminal portions 36 at the ends of the spring fingers 34 project beyond the free ends of the leg sections 24 and 26 of the packing ring.

As a result of this relative construction and assembly of the expander ring 27, packing ring 23 and holding ring 42, the packing ring 23 is yieldably supported on the spring fingers 34 so that the leg sections 24 and 26 of the packing ring are permitted to rock or move in directions both longitudinally and transversely relative to the piston 11, as a result of the reciprocal movement of the piston 11. By virtue of the curved construction of the terminal ends 36 of the spring fingers 34, this rocking movement of the packing ring 23 relative to the expander ring 27 takes place freely, since any scraping action between the terminal ends 36 and packing ring leg sections 24 and 26 is substantially eliminated.

It is seen, therefore, the assembly of the packing ring 23 and expander ring 27 is confined within the recess 43, but with relative movement within this confined space being permitted between the packing ring and the expander ring.

An oil wiper 50 for the piston 11 is arranged about the piston so as to over lie the inner peripheral top side portion of the holding ring 42 and is held in wiping contact with the piston by a resilient clamping ring 51 having a flat base portion 52 superposed over the outer peripheral portion of the top side of the holding ring 42. A series of clamping bolts 53 are extended through the clamping ring 52, holding ring 42, bearing portion 21 and cylinder flange 18, so that on tightening of the bolts 53 all of these parts are concurrently secured and clamped against the cylinder flange 18.

In the use of the piston oil seal unit 17 the yieldable or floating support of the packing ring 23 on the expander ring 27 maintains a fluid seal between the base section 25 of the packing ring and the end wall 46 of the recess 43, and the independent spring action of the expander ring leg sections 29 and 31 yieldably urges the packing ring legs 24 and 26 outwardly away from each other into fluid sealing contact with the piston 11 and side wall 44 of the recess 43, respectively. This fluid sealing action of the oil seal unit 17 is maintained over a prolonged service life by virtue of the yieldable movement of the packing ring 23 relative to the expander ring 27.

It is to be further noted that in the event of any oil leakage from the space 16, between the cylinder 10 and piston 11, along the upper bearing portion 22 and into the recess 43, this oil under pressure aids or complements the action of the spring fingers 34 in yieldably moving the packing ring leg sections 24 and 26 outwardly away from each other to maintain an oil seal contact between these leg sections and their corresponding contacted surfaces. To further aid in maintaining this seal at the high fluid pressures occurring in the operation of the lift piston 11, oil under pressure is admitted into the recess 43 and between the legs 24 and 26 of the packing ring 23, by the provision of a bleeder passage 55, open to the recess 43 and to the space 16 between the piston 11 and the cylinder 10.

From a consideration of the above description it is seen that the invention provides an oil seal unit between a movable member and a stationary supporting member therefor which is of a compact and simple construction, and positive in action to maintain an efficient oil seal over a prolonged serviced period. The yieldable movement of the packing ring 23 relative to the expander ring 27 substantially eliminates any wedging of the packing ring in a position which would impair or destroy its oil sealing action. It is to be noted further that the expander ring 27 is of an improved construction, adapted to be economically manufactured, and then shipped and handled in straight lengths for later fabrication into expander rings of any desired diameter.

Although the invention has been described with respect to a preferred embodiment thereof, and illustrated as applied to a vehicle hoist, it is to be understood that it is not to be so limited since changes can be made therein which are within the full intended scope of this invention as defined by the appended claims.

I claim:

1. As an article of manufacture, an expander ring for a resilient packing member of a U-shape in transverse cross section, said expander ring being formed from two members of a substantially V-shape in transverse cross section, and each of said members being formed of a spring material with one of the legs thereof comprised of a series of spaced spring fingers, and means for securing together the other legs of said two members such that the one legs thereof are arranged opposite each other transversely of the expander ring.

2. A piston oil seal unit for use with a hydraulic hoist comprising a resilient packing ring of a U-shape in transverse cross section, a resilient expander ring of a substantially V-shape in transverse cross section positioned between the leg sections of said packing ring so that the apex portion of said expander ring is adjacent to and spaced from the base section of said packing ring, the leg sections of said expander ring terminating in curved portions extended toward each other and projected outwardly of the leg sections of said packing ring, said expander ring leg sections being in contact engagement with the corresponding leg sections of said packing ring adjacent their terminal ends, and an anular support member located between the leg sections of said expander ring and having one end thereof secured to said apex and the other end extended beyond said leg sections.

3. An expander ring comprising a plurality of ring sections of a substantially V-shape in transverse cross section, with each of said ring sections being formed of a spring material and having one of the legs thereof comprised of a series of spaced spring fingers, with certain ones of said sections being arranged relative to the remaining ones of said sections so that the other legs of said sections are positioned against each other in a side by side relation with the one legs thereof arranged opposite each other transversely of the expander ring, said certain sections having the adjacent ends of the other legs thereof spaced circumferentially of the ring from the adjacent ends of the other legs of said remaining sections, and means for securing together the other legs of said certain and remaining sections.

References Cited in the file of this patent

UNITED STATES PATENTS

| | | |
|---|---|---|
| 2,253,904 | Haug | Aug. 26, 1941 |
| 2,342,458 | Davies | Feb. 22, 1944 |
| 2,451,888 | Thompson | Oct. 19, 1948 |
| 2,454,036 | Clayton-Wright | Nov. 16, 1948 |

FOREIGN PATENTS

| | | |
|---|---|---|
| 589,768 | Great Britain | June 30, 1947 |